July 7, 1964 W. MORDSTEIN 3,139,970
ARRANGEMENT FOR INVERTING THE SIDES OF BELTS
IN ENDLESS CONVEYORS AND THE LIKE
Filed Jan. 9, 1961 3 Sheets-Sheet 1
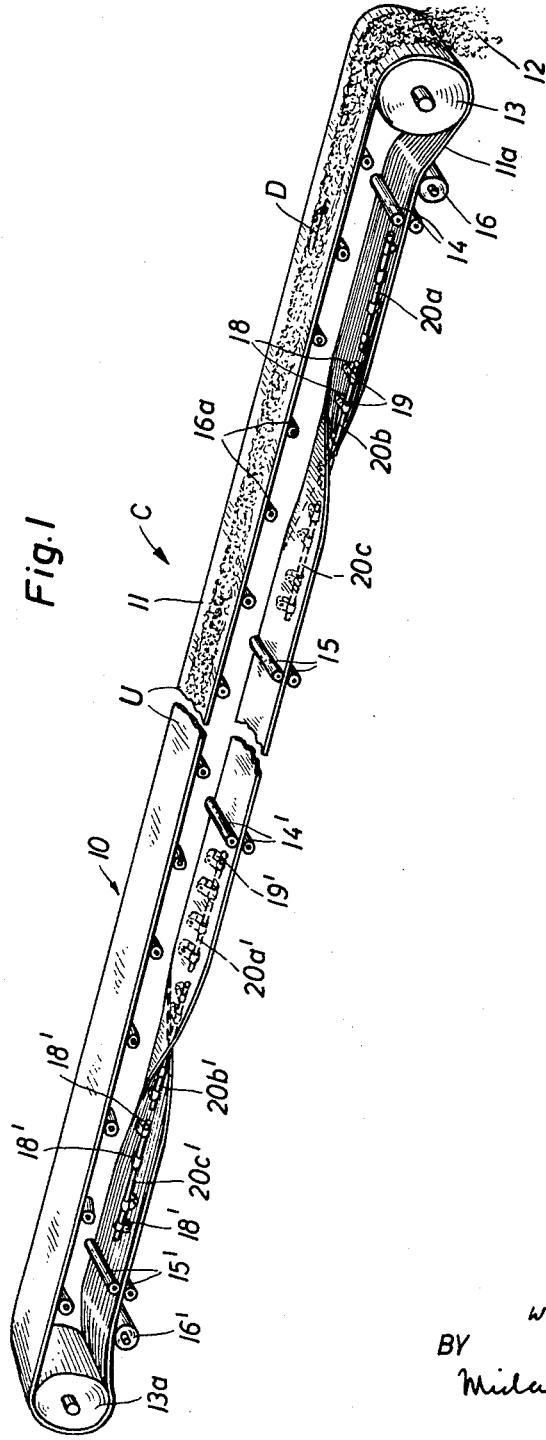
INVENTOR:
WALTER MORDSTEIN
BY
his ATTORNEY

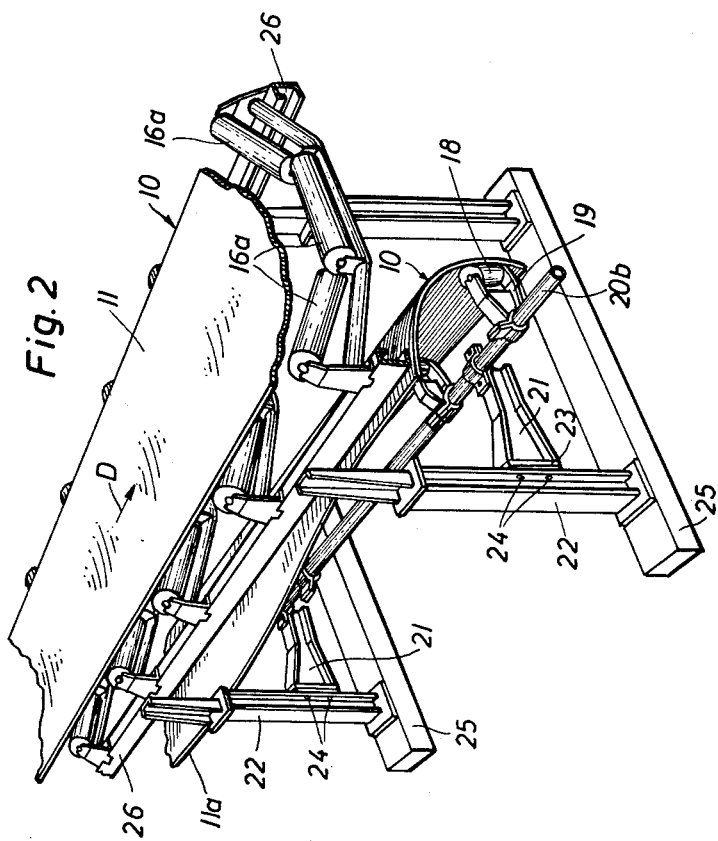

July 7, 1964
W. MORDSTEIN
3,139,970
ARRANGEMENT FOR INVERTING THE SIDES OF BELTS
IN ENDLESS CONVEYORS AND THE LIKE
Filed Jan. 9, 1961
3 Sheets-Sheet 3
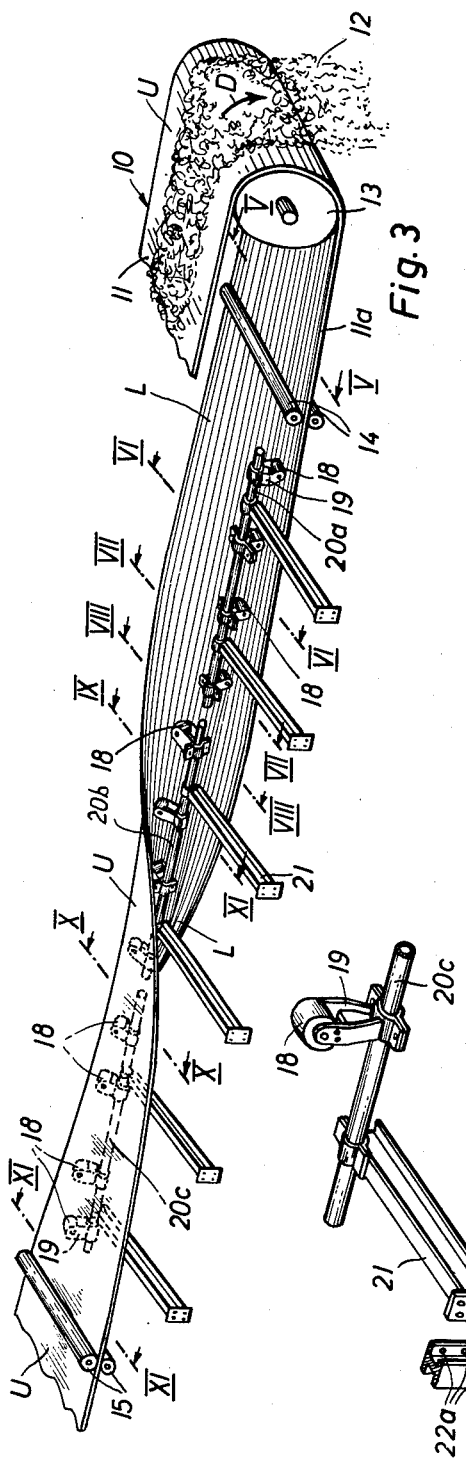
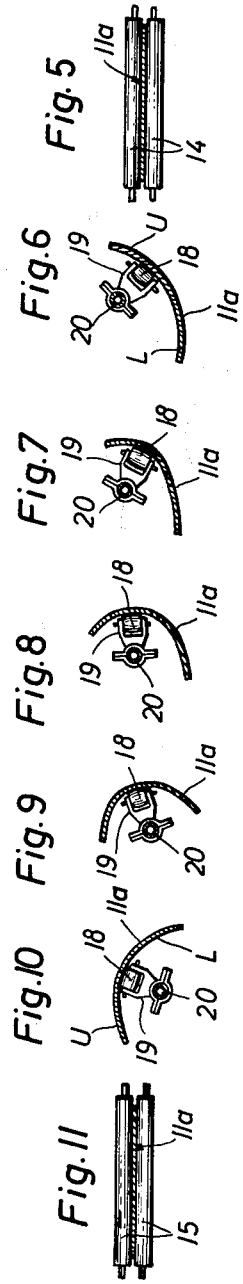
INVENTOR:
WALTER MORDSTEIN
BY
his ATTORNEY United States Patent Office 3,139,970
Patented July 7, 1964

1

3,139,970
ARRANGEMENT FOR INVERTING THE SIDES OF BELTS IN ENDLESS CONVEYORS AND THE LIKE
Walter Mordstein, Frechen, Germany, assignor to Rheinische Braunkohlenwerke Aktiengesellschaft, Cologne, Germany
Filed Jan. 9, 1961, Ser. No. 81,429
Claims priority, application Germany Jan. 9, 1960
8 Claims. (Cl. 198—184)

The present invention relates to an arrangement for inverting the sides of an elongated belt, and more particularly to an arrangement for twisting and untwisting the belt of an endless belt conveyor in such a way that the sides of the belt are inverted and thereupon returned to their prior positions before the belt completes a run between two spaced deflecting drums.

In conveyor systems which utilize endless bands for the transportation of pulverulent, granular and similar goods, it can be observed time and again that, depending on the nature and consistency of the conveyed material and/or on climatic conditions, a certain amount of conveyed material will adhere to the exposed side after the bulk of the material has descended by gravity at the discharge end of the belt. The remnants of conveyed material travel along the lower run of the belt and are scraped or rubbed off upon contact with the customary supporting and guiding rolls which are disposed below and are in contact with the underside of the lower run. Consequently, the material separated from the underside of the lower run accumulates on certain component parts of the conveyor system and contaminates the area in which the conveyor is installed. In addition, a certain percentage of material is wasted or can be recovered only with substantial losses in manhours.

An important object of the invention is to provide an arrangement for inverting the lower or idle run of the belt in an endless conveyor whereby that side of the belt which might carry some remnants of conveyed material is turned upwardly and the remnants cannot or are less likely to be separated from the belt.

Another object of the invention is to provide an arrangement of the just outlined characteristics which is capable of inverting a belt without unduly stretching or deforming the same.

A further object of my invention is to provide a belt inverting arrangement which comprises a small number of component parts and which may be readily adjusted so that it can be used in connection with belts of different width, thickness and/or flexibility.

An additional object of the instant invention is to provide an arrangement of the above outlined characteristics which can be readily installed in all or nearly all types of endless belt conveyors.

Still another object of the invention is to provide a belt inverting or twisting arrangement which is capable of twisting and subsequently untwisting a moving belt in a fully automatic way and which can complete the twisting and untwisting of the belt without requiring a lengthening of the idle run of the belt and without the danger that the belt would slip off the deflecting drums at the end turns of the conveyor.

An additional object of the invention is to provide a belt inverting or twisting arrangement which occupies little space, which is capable of operating for extended periods of time without requiring any attention and which may be readily removed from the conveyor or rendered inactive in the event that the nature of conveyed material and/or the momentary climatic conditions, such as the moisture contents of surrounding air, should render the twisting and untwisting of the belt unnecessary.

With the above objects in view, the invention resides in the provision of an arrangement which in its basic form comprises an elongated belt, means for guiding the belt for movements in a predetermined path, i.e. along the lower run of a conveyor, and helical twisting means located along the path of the belt and having a predetermined axis which is substantially parallel with the path, the twisting means engaging with the belt for twisting the same. In accordance with a preferred embodiment of the invention, the helical twisting means comprises a plurality of spaced preferably spherical twisting rollers rotatable about axes which are substantially perpendicular to the path of the belt and carried by one or more supporting members whose common axis coincides with the axis of the helix along which the rollers are arranged. The axial length of the rollers is preferably less than the width of the belt which insures that the rollers can invert the belt though the diameter of the helix along which they extend is substantially less than the width of the belt. This is of particular advantage when the belt is one of considerable width. Furthermore, by utilizing twisting rollers of comparatively small axial length and by arranging the rollers in the form of a helix so that they successively engage transversely spaced zones at one side of the belt, the latter is subjected to small stretching forces and does not slide off its guiding and deflecting drums which are customarily provided at both end turns of an endless belt conveyor.

Certain other features of the invention reside in the provision of specially mounted brackets for the twisting rollers which are angularly and axially adjustable about and longitudinally of the supporting means, in the provision of special adjusting means for the supporting means so that the latter may be shifted in directions parallel with and normal to the lower or idle run of an endless belt, in the provision of guiding rolls which insure that the belt is flattened or spread out immediately adjacent to each outermost twisting roller, and in the provision of two twisting stations along the lower or idle run of an endless belt conveyor so that one of the stations insures an inversion or twisting of the belt adjacent to the discharge end of the conveyor and that the other station insures an untwisting of the belt before the belt reaches the material receiving portion of the conveyor.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 1 is a perspective view of an endless belt conveyor whose lower run is combined with a twisting and untwisting arrangement;

FIG. 2 is a greatly enlarged fragmentary perspective view of a twisting arrangement;

FIG. 3 is another enlarged perspective view of an entire twisting arrangement;

FIG. 4 is an enlarged exploded perspective view of a support for the twisting rollers and of means for adjusting the support transversely of as well as toward and away from the belt; and FIGS. 5 to 11 are transverse sections taken respectively along the lines V—V, VI—VI, VII—VII, VIII—VIII, IX—IX, X—X and XI—XI of FIG. 3, as seen in the direction of the arrows.

Referring now in greater detail to the illustrated embodiment, and first to FIG. 1, there is shown an endless belt conveyor C which comprises an endless flexible belt 10 of uniform width and two guide means in the form of deflecting drums 13, 13a the former of which is located at the discharge end 12 of the belt 10. It is assumed that the belt moves in the direction of the arrow D so that a granular, pulverulent or like material that is continuously or intermittently fed to the upper side U of the upper run 11 is discharged at the right-hand end turn or discharge end 12. Normally, the upper side U of the upper run 11 would become the underside of the lower run 11a so that any particulate matter adhering to the belt 10 below the right-hand guiding and deflecting drum 13 would be likely to become separated from the belt upon contact with a series of spaced guiding rolls 14, 15 and 16 which are disposed along the lower run 11a to support and to guide the belt toward the left-hand deflecting drum 13a. The upper run 11 is supported by a series of rolls 16a which are positioned in such a way (see FIG. 2) that the upper run actually assumes the shape of a trough or channel which can accommodate large quantities of a comminuted material.

The arrangement which twists the lower run 11a of the belt 10 immediately adjacent to the right-hand drum 13 is shown in greater detail in FIGS. 2 to 11. Referring first to FIG. 3, it will be seen that this arrangement comprises a helical means consisting of spaced twisting elements in the form of rollers 18 and that the axis of this helical means is parallel with and is located along the path of the belt 10, and more particularly along the latter's lower run 11a. The axis of the helical means coincides with the axis of a composite supporting means consisting of elongated rod-shaped or tubular members 20a–20c each of which is preferably of circular cross-sectional contour. The provision of composite supporting means facilitates the adjustment and mounting of the rollers at each twisting station. Each of the members 20a–20c may support one or more twisting rollers 18, and the latter are mounted in suitably configurated support structures here shown as brackets 19 (see FIG. 4) which extend substantially radially with respect to the supporting means and are preferably longitudinally as well as angularly adjustable thereon so that the spacing of the rollers 18 as well as the exact point of their contact with the underside L of the upper run 11 (which is the upper side of the lower run 11a in the right-hand part of FIG. 3) may be varied as desired. It will be noted that the rollers 18 in their entirety form one-half of one convolution about the axis of the supporting means 20a–20c and that these rollers engage that side of the belt 10 which is not in contact with the conveyed material. This reduces the likelihood that the remnants adhering to the upper side U would become separated from the lower run 11a which could result in accumulation of particulate matter on the ground about the conveyor C.

The twisting arrangement of FIG. 3 operates as follows:

The belt 10 passes about the right-hand deflecting drum 13 to discharge the material at the end turn 12, and its side U which was the upper side along the upper run 11 but which becomes the underside along the lower run 11a passes above a supporting roll 16 and subsequently between a pair of additional supporting rolls 14 (see also FIG. 5). Adjacent to the rolls 14, the side L of the belt 10 along the lower run 11a comes into engagement with the first or foremost roller 18 and is subsequently engaged by the other roller 18 which together form substantially one-half of a full helical convolution so that the belt is twisted and its side U is inverted through 180 degrees about the axis of the supporting means 20a–20c so that it faces in upward direction without ever coming into contact with the rollers 18. Thus, the material still adhering to the side U is not likely to be separated therefrom. The rollers 18 consecutively engage transversely spaced zones of the side L so that their stretching action is uniformly distributed through the full width of the belt. It is preferred to arrange the rollers 18 in such a way that they do not engage the belt portions immediately adjacent to the two edges of the lower run 11a. The axial length of the rollers 18 is much less than the axial length of rolls 14 so that the belt sides U, L may be inverted without requiring for such inversion a space whose height equals the width of the belt 10. It will be noted that the sides of the belt are inverted while the belt is arched in transverse direction (FIGS. 6–10) which prevents excessive stretching of the belt, such as would take place if the rollers 18 would extend through the full width of the lower run 11a. Furthermore, the provision of short rollers renders it possible to reduce the length of each twisting station so that the position of the sides U, L is inverted shortly after the drum 13.

After passing the last roller 18, the twisted lower run 11a travels between two supporting and flattening rolls 15 (see FIG. 11) on its way to the second twisting station which is shown in the left-hand half of FIG. 1. This second twisting station is identical with the one shown in FIG. 3, with the exception that it untwists the lower run 11a so that the side U becomes the underside at the rolls 15' and 16', and that the side L becomes the upper side at the rolls 15'. The parts of the left-hand twisting station shown in FIG. 1 are identified by reference numerals utilized in FIG. 3 followed by a prime.

The supporting members 20a–20c and 20a'–20c' are held by spaced substantially horizontal carrier arms 21 which are fixed to uprights 22 forming part of the frame for the endless belt conveyor C. As shown in FIG. 4, the supporting member 20c may be adjusted transversely of the belt (i.e., in a direction which is parallel to the plane of the belt path) by utilizing one or more inserts 23 which are insertable between the outer end of the carrier arm 21 and the upright 22. Thus, the arms 21 and the inserts 23 together constitute means for adjusting the supporting member 20c transversely of the belt and, since the upright 22 is formed with a number of vertically spaced holes 22a, the arm 21 may be connected thereto at different distances from the ground so that the supporting member 20c is vertically adjustable in directions toward and away from the lower run 11a (i.e., in directions normal to the plane of the belt path). The bolts 24 which connect the arms 21 to the uprights 22 are shown schematically in FIG. 2. The uprights 22 which are mounted on transversely extending base plates 25 carry at their upper ends rails 26 which support the aforementioned rolls 16a for the upper run 11.

The multiple adjustability of the brackets 19, of the supporting members 20a–20c, and of the carrier arms 21 renders it possible to utilize the twisting arrangement in connection with different types of belts and to reduce the length of a twisting station to the very minimum. The brackets 19 are angularly and axially adjustable on their supporting members, the latter are axially and angularly adjustable in the arms 21, and the arms are adjustable in vertical and horizontal planes so that the helix formed by the rollers 18 may assume any desired shape by changing its axial length, its pitch, and the spacing between the adjacent twisting rollers.

It will be readily understood that the lower rolls of the pairwise arranged rolls 14, 15, 14', 15' and the rolls 16, 16' may be omitted so that the side U never comes into contact with any component parts of the conveyor but solely with the comminuted material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A belt twisting and inverting arrangement, comprising an endless moving belt; a pair of spaced guide means arranged to guide said belt so that a portion of the belt between said guide means advances in a substantially straight path, said portion of said belt being inverted between said guide means and having an inner side and an outer side; and twisting means of substantially helical outline located along and having an axis which is substantially parallel with said path, said twisting means comprising a plurality of helically arranged twisting members engaging the inner side of and deforming said portion of said belt into a body of arcuate cross section, each of said twisting members engaging a portion of said inner side whose width is substantially less than the width of said belt so that all zones of said portion of said belt are subjected to substantially equal stretching forces.

2. An arrangement as set forth in claim 1, wherein said portion of said belt is inverted through about 180° and wherein said twisting means extends through approximately one-half of a full convolution, said twisting members successively engaging and deforming transversely spaced zones of said portion of said belt.

3. An arrangement as set forth in claim 1, wherein said twisting members are rollers arranged to rotate about axes which are substantially perpendicular to said path and wherein the axial length of each roller is substantially less than the width of said belt.

4. An arrangement as set forth in claim 1, wherein said twisting means comprises elongated axially extending supporting means and a support structure for each of said twisting members, each support structure being adjustable axially and angularly with reference to and being mounted on said supporting means, and means for adjusting said supporting means in directions normal to said path.

5. In a belt conveyor, in combination, an endless moving belt having a first run and a second run; a plurality of guide means adjacent to and arranged to guide two spaced portions of one of said runs in straight paths, each portion of said one run being inverted between the respective guide means and each having an inner side and an outer side; and a pair of twisting means each extending along and each having an axis substantially parallel with one of said paths, each twisting means comprising a plurality of helically arranged rollers rotatable about axes which are substantially perpendicular to the respective portions of said one run and the axial length of each roller being substantially less than the width of said belt, said rollers engaging the inner sides of the respective portions of said one run and deforming said portions into bodies of arcuate cross section, said portions of said one run being inverted in opposite directions.

6. A belt twisting and inverting arrangement, comprising an elongated belt having a first side and a second side; spaced first and second guide means for guiding said belt in a substantially straight elongated path; elongated supporting means located intermediate said first and second guide means along said path and having an axis substantially parallel with the longitudinal extension of said path; and twisting means mounted on said supporting means, said twisting means comprising a plurality of spaced substantially helically arranged twisting elements extending through approximately one-half of one convolution about said axis and successively engaging transversely spaced zones at one side of said belt to thereby invert the position of said sides, said twisting means further comprising a support structure for each of said twisting elements, said support structures being secured to and being adjustable in the axial direction of said supporting means.

7. A belt twisting and inverting arrangement, comprising an elongated belt having a first side and a second side; spaced first and second guide means for guiding said belt in a substantially straight elongated path; elongated supporting means located intermediate said first and second guide means along said path and having an axis substantially parallel with the longitudinal extension of said path; and twisting means mounted on said supporting means, said twisting means comprising a plurality of spaced substantially helically arranged twisting elements extending through approximately one-half of one convolution about said axis and successively engaging transversely spaced zones at one side of said belt to thereby invert the position of said sides, said twisting means further comprising a support structure for each of said twisting elements, said support structures being secured to and being angularly adjustable about the axis of said supporting means.

8. A belt twisting and inverting arrangement, comprising an elongated belt having a first side and a second side; spaced first and second guide means for guiding said belt in a substantially straight elongated path; elongated supporting means located intermediate said first and second guide means along said path and having an axis substantially parallel with the longitudinal extension of said path; means for adjusting said supporting means in directions normal to the longitudinal extension of said path; and twisting means mounted on said supporting means, said twisting means comprising a plurality of spaced substantially helically arranged twisting elements extending through approximately one-half of one convolution about said axis and successively engaging transversely spaced zones at one side of said belt to thereby invert the position of said sides.

References Cited in the file of this patent

UNITED STATES PATENTS

| | | |
|---|---|---|
| 667,975 | Dodge | Feb. 12, 1901 |
| 2,212,006 | Buchanan | Aug. 20, 1940 |
| 2,222,019 | Buchanan | Nov. 19, 1940 |
| 2,732,058 | Nigra et al. | Jan. 24, 1956 |
| 2,784,834 | Trinkle | Mar. 12, 1957 |
| 2,979,187 | Erickson | Apr. 11, 1961 |

FOREIGN PATENTS

| | | |
|---|---|---|
| 528,450 | Germany | June 29, 1931 |
| 591,917 | France | Apr. 20, 1925 |
| 701,056 | Germany | Jan. 7, 1941 |
| 1,062,173 | Germany | July 23, 1959 |